US009361540B2

(12) United States Patent
Garcia Morato Fernandez Baillo et al.

(10) Patent No.: US 9,361,540 B2
(45) Date of Patent: Jun. 7, 2016

(54) FAST IMAGE PROCESSING FOR RECOGNITION OBJECTIVES SYSTEM

(75) Inventors: Pablo Garcia Morato Fernandez Baillo, Madrid (ES); Frida Issa, Madrid (ES)

(73) Assignee: AUGMENTED REALITY LAB LLC, Coral Gables, FL (US)

( * ) Notice: Subject to any disclaimer, the term of this patent is extended or adjusted under 35 U.S.C. 154(b) by 0 days.

(21) Appl. No.: 13/586,681

(22) Filed: Aug. 15, 2012

(65) Prior Publication Data

US 2014/0050401 A1 Feb. 20, 2014

(51) Int. Cl.
*G06K 9/34* (2006.01)
*G06K 9/46* (2006.01)

(52) U.S. Cl.
CPC .................................... *G06K 9/4642* (2013.01)

(58) Field of Classification Search
None
See application file for complete search history.

(56) References Cited

U.S. PATENT DOCUMENTS

| 7,738,687 | B2 * | 6/2010 | Tortora | G06K 9/6211 382/131 |
| 8,621,355 | B2 * | 12/2013 | Eppolito | G11B 27/034 715/203 |
| 8,706,341 | B2 * | 4/2014 | Madsen | A01B 69/001 382/104 |
| 2003/0002740 | A1 | 1/2003 | Melikian et al. | |
| 2007/0040035 | A1 * | 2/2007 | Kotlarsky | G06K 7/10683 235/462.45 |
| 2007/0053589 | A1 * | 3/2007 | Gering | G06T 7/0081 382/173 |
| 2007/0100226 | A1 * | 5/2007 | Yankelevitz | A61B 5/1075 600/407 |
| 2007/0147683 | A1 * | 6/2007 | Hwang et al. | 382/190 |
| 2007/0172129 | A1 * | 7/2007 | Tortora | G06K 9/6211 382/218 |
| 2008/0118124 | A1 * | 5/2008 | Madabhushi | G06K 9/469 382/128 |
| 2009/0150821 | A1 * | 6/2009 | Mathan | 715/781 |
| 2009/0174773 | A1 * | 7/2009 | Gowdy | B60R 1/00 348/148 |
| 2009/0208106 | A1 * | 8/2009 | Dunlop | G06K 9/00711 382/173 |
| 2010/0260426 | A1 * | 10/2010 | Huang et al. | 382/218 |
| 2011/0158533 | A1 * | 6/2011 | Gutelzon et al. | 382/176 |
| 2012/0072068 | A1 * | 3/2012 | Madsen | A01F 15/0833 701/28 |
| 2012/0198317 | A1 * | 8/2012 | Eppolito | G11B 27/034 715/202 |

FOREIGN PATENT DOCUMENTS

WO 2011071467 A1 6/2011

OTHER PUBLICATIONS

International search report dated Feb. 14, 2014 issued in corresponding PCT application PCT/US13/54655.
International Preliminary Report on Patentability dated Feb. 17, 2015 issued in corresponding PCT application PCT/US2013/054655.

* cited by examiner

*Primary Examiner* — Feng Niu
(74) *Attorney, Agent, or Firm* — DLA Piper LLP (US)

(57) ABSTRACT

An image processing for recognition objectives system including uploading n image to a processor and associated memory via a network, dividing the images into a plurality of sub-images, preprocessing, uploading an image to be recognized from an image source to the processor and associated memory, pre-processing the image to be recognized and a first the plurality of sub-images, extracting key features from the image to be recognized and a first of the plurality of sub-images, comparing the key features of the image and the first of the sub-images, if there is a match, display the match and if there is no match, advance to the next of the plurality of sub-images and repeat until a match is determined.

2 Claims, 3 Drawing Sheets

FAST IMAGE PROCESSING FOR RECOGNITION OBJECTIVES SYSTEM

BACKGROUND OF THE INVENTION

1. Field of Invention

The present invention relates generally to computer recognition of an image and more particularly to optimizing the speed with which the image is recognized in a real scene.

2. Prior Art

As our visual world is becoming richer and our life is becoming full of screens projecting for us visual information our necessity to analyze and understand what we are seeing is becoming even more and more essential. Computers, Mobile devices, Television, Medical Equipments, Video Conferences, Video Screen Glasses are only few of the visual information sources that bring to our eyes information. Therefore, image processing capabilities allow us to recognize images, objects, faces and movements in both reality scenes and all of our visual information sources.

Feature point extraction and recognition is a key to modern approaches to image recognition, face recognition and object detection or movement detection, but these approaches generally require computationally expensive processing times. In other words, they take a long time and present a fundamental problem in computer vision, particularly object recognition, object tracking, and object localization.

In the prior art there are methods for image or object or face recognition and in such prior art systems a correspondence between the object to be recognized in the current scene has to be recognized. The set of correspondences (C) is generally automatically generated using feature detectors which try to identify and map several features of the image on the current frame. Such approaches include scale invariant feature transform (SIFT), speeded up robust features (SURF or Java SURF) and center-surround extremas (CenSurE).

However, such image processing features extraction approaches still require computationally expensive processing times and are still not applicable to mobile devices such as smart phones, entertainment devices such as TV, mobile sophisticated devices for military purposes.

One of the problems in image processing is the time it takes for the processors to carry out the tasks of feature extraction and comparisons and the requirement of heavy computational time. This creates low performance and bad user experience especially in real time responsiveness requirement.

One solution used to increase the speed of the processing is by down scaling both database information and input scene information to work only less quantity of information. This solution brings up acceleration benefits, however, it can lead to accuracy problems since reducing the size means reducing and losing part of the original data and therefore ending up with mismatches and low quality of the recognition which can be very crucial in some cases like medical or military systems and very unpleasant experience when a user has high definition quality images and on the other hand a system that as bigger the information is the worse is the quality of the recognition.

SUMMARY OF THE INVENTION

Accordingly, it is a general object of the present invention to provide an image processing for recognition objectives system which overcomes the difficulties of the prior art set forth above.

In particular, it is an object of the present invention to provide an image processing for recognition objectives system that is capable of operating in real time or near real time in a any relatively low computer power devices such as a smartphone.

It is another object of the present invention to provide a system which can utilize the cloud computing environment.

In keeping with the principles of the present invention, the objects here are accomplished by an image processing for recognition objectives system including connecting via a network to at least one processor associated with a memory which could all be provided in a cloud environment, uploading an image to the memory from a source of images such as a smartphone, tablet, netbook, camera, lap top, TV, medical graphical equipment etc., storing it in the memory, uploading an image to be recognized from an image source such as a, tablet, netbook, camera, lap top, etc., to the processor via the network, preprocessing the image to be recognized, extracting key features from the image to be recognized, dividing the image into a plurality of (1-n) sub-images, preprocessing a first of the (1-n) sub-images, extracting key features from a first of the plurality of (1-n) sub-images, comparing key features of the image to be recognized with key features of the first of the plurality of (1-n) sub-images and if there is a sufficient match of key features, determining there is a match and displaying the match on a display. If there is not a sufficient match of the key features, the next of the plurality of (1-n) sub-images and repeat the steps above until there is a match.

To further speed up the operation of the present invention, as mentioned above, a cloud environment could be utilized. The cloud environment is a system including a plurality of machines and associated memories for handling complex tasks concurrently. The cloud architecture of the present invention includes a dynamic number of machines created to present high performance in measures of speed and scalability. The machines are coordinated by one master machine that receives the load of tasks and splits it over the available machines and creating new ones as necessary. The other machines are called slave machines and handle specific tasks ordered by the master machine. All the machines communicate together using a high speed network to send messages through all parts of the system. Each request to the cloud is handled by the master machine and it splits it into subtasks and puts it in an indexed queue. The tasks are sent to the rest of the slave machines and are removed from the queue only after they are done. Response is sent to the user once all subtasks are finished. Another part of the cloud is the database which is also distributed over several machines and has one machine to control the requests for access. The access is synchronized in this multi-threaded environment. Also, all the system parts are backed up for recovery if one or more shuts down. In the embodiment described above, all of the steps of the present invention except for connecting to the processor and associated memory, uploading the plurality of images, uploading the image to be recognized and downloading the matched image and displaying the best match on the display are all performed in at least one processor having a memory associated therewith in association with software, particularly in a cloud environment.

In other embodiments the task described above can be divided in other ways between the mobile device (smartphone) and a separate processor and associated memory connected to the mobile device via a network.

BRIEF DESCRIPTION OF THE DRAWINGS

The above mentioned features and objects of the present invention will become more apparent based upon the following description taken in conjunction with the accompanying drawings and in which.

DETAILED DESCRIPTION OF THE INVENTION

Figure 1:
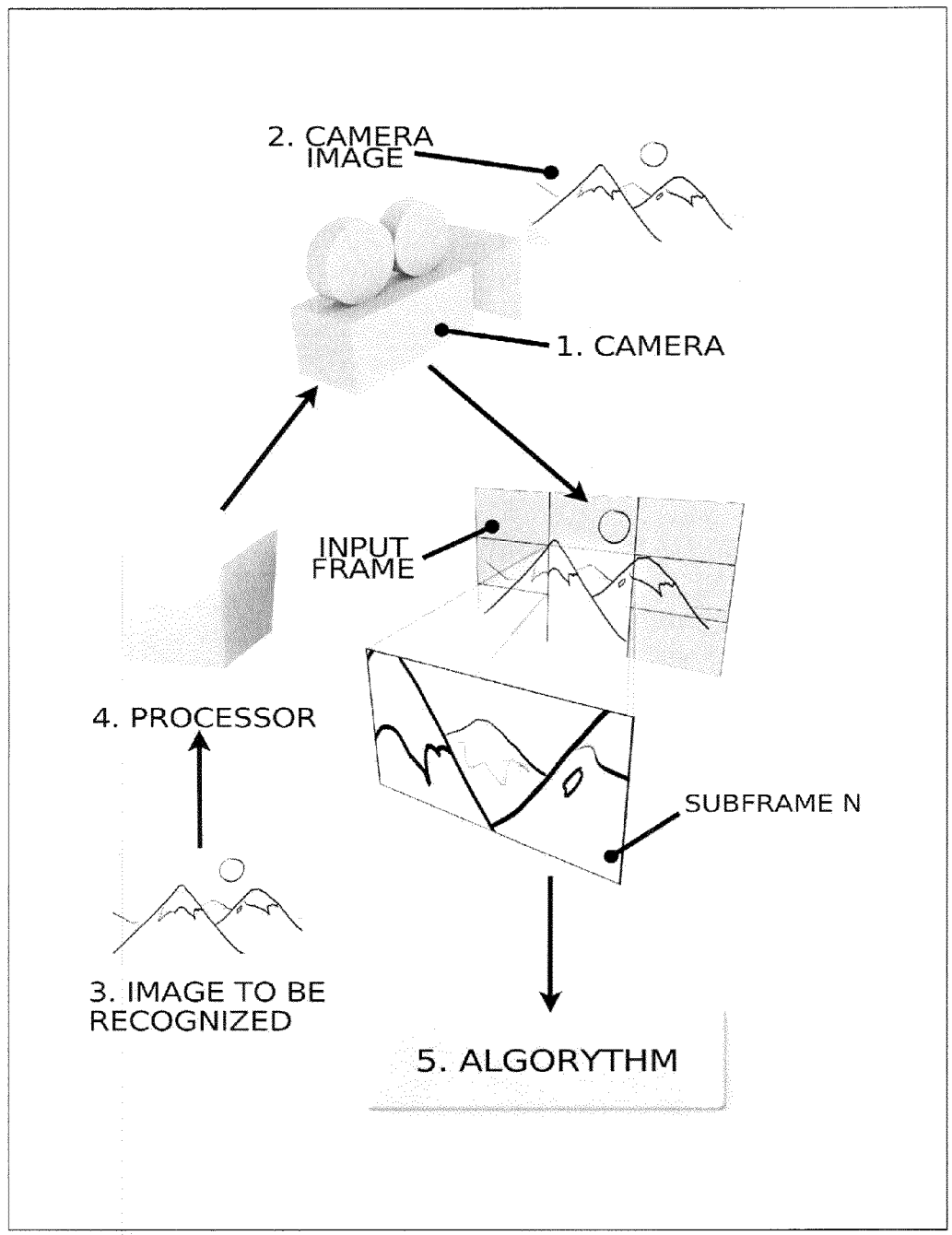
FIG. 1 is a high level diagram of an embodiment of the present invention.
Figure 2:
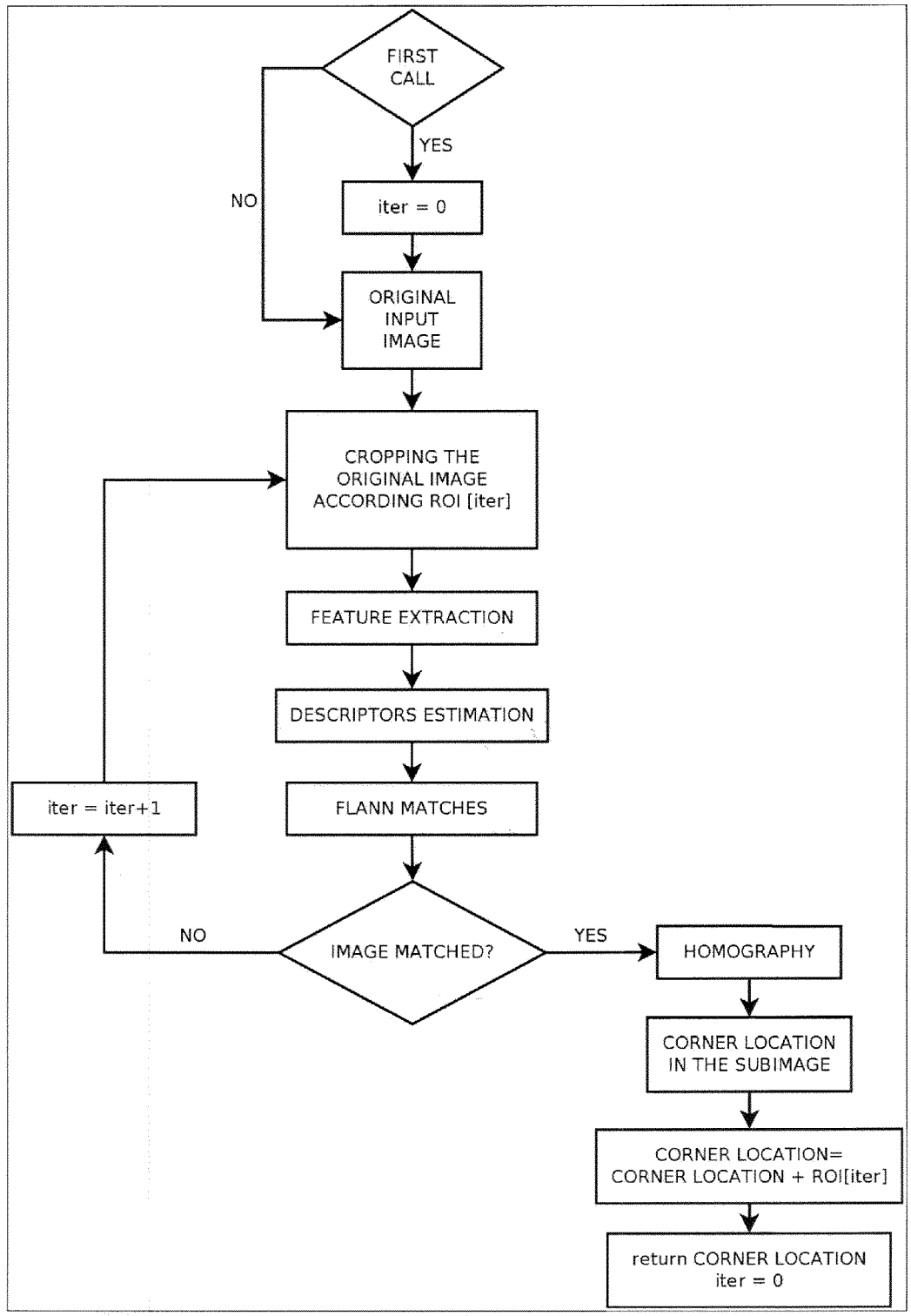
FIG. 2 is a flow chart illustrating the embodiment of the present invention.

Referring to FIGS. 1 and 2, shown therein is an embodiment of the present invention. In the image processing for recognition objectives system of FIGS. 1 and 2, a web user interface (camera) 1 is connected via a network such as the internet to a server. The server would include a processor, memory and software and in the case of a cloud computing system would further include master and slave machines. The memory is utilized for not only the software but also to support a database of the images and sub-images. A multi-platform image input device such as a cellular phone, smartphone, laptop computer, desktop computer, tablet, netbook, video camera, still camera, a source of streaming video, etc. is connected via the web user interface 1 and to a processor 4 via a network such as the internet and/or a data network carried on a cellular telephone system, such as G3 or G4 data system, is preferred. Still further, the web user interface 1 can be any device that has access to a network and has images which can be recognized under the formats utilized by the system.

In operation, firstly the image processing for recognition objectives system is registered on the server, preferably a cloud environment, which includes an application program interface (API) which includes an account which is supported by a username and password. Alternately and for other operating systems other interfaces could be utilized such as an application binary interface (ABI) which can be utilized with Linux.

Figure 3:
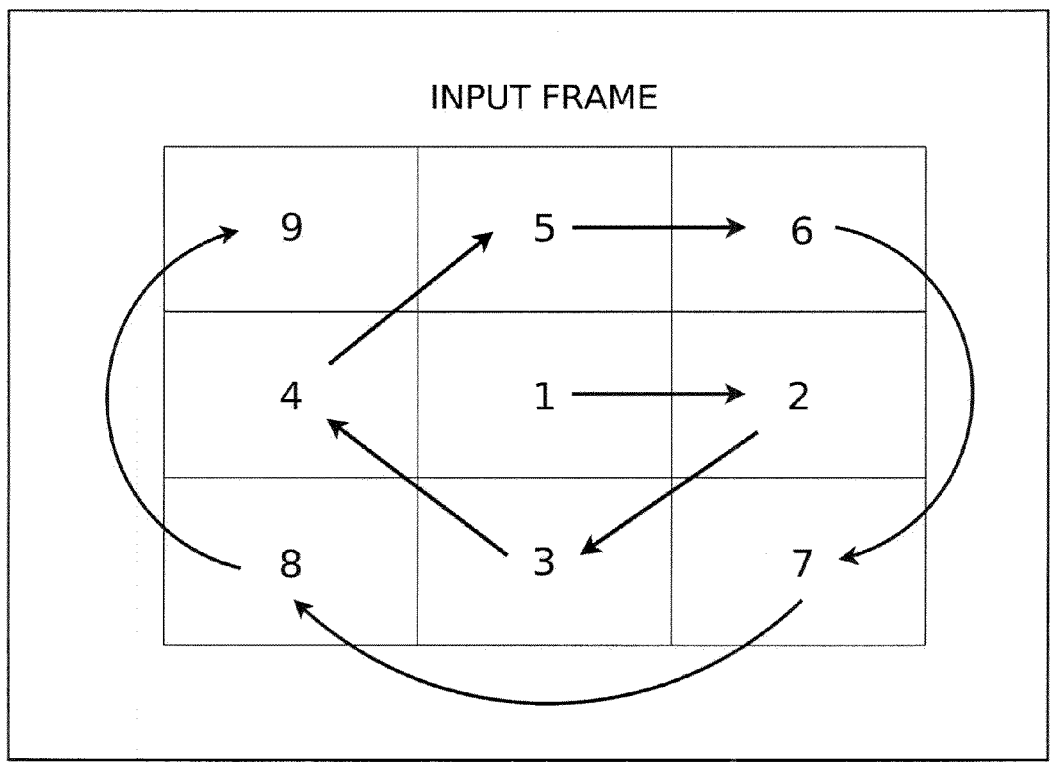
FIG. 3 illustrates how the images can be divided up into distinct sub-images and ordered.

After the image processing for recognition objectives system is registered on the server, each time an image (2) of a real scene is captured by the camera 1, it will be processed by the algorithm 5 as is shown in the flow diagram of FIG. 2. The first time the algorithms 5 are executed in the server, their count variable is set to one. This variable controls the sub-image of the plurality of sub-images (1-n) of the image 2 which will be selected and will increase as the image 3 to be recognized is not matched to a sub-image. The order for selecting each one of the sub-images (1-n) is estimated according to the probability where the image to be recognized 3 will appear in the image 2 in the real world. The likelihood that the image 3 is in the middle is generally higher than it would appear in the upper left corner. As a result, the image is divided into the sub-images (1-n) with estimated probabilities as shown in the FIG. 3. The probabilities can be dynamically updated in case of tracking to put the highest probability of finding the object we are looking for in the closest sub regions to the previous processed frame sub regions. The first sub-image is passed to the algorithms 5 where it will be processed using several image processing procedures which can be characterized as pre-processing. For example, in order to process the image before applying one of the methods existing for feature extraction, a conversion from RUB or BGR to gray scale can be applied and later a filter for blurring the image such as a Gaussian filter or mean filter can be utilized to remove the detail and noise for extracting the key features. The Gaussian filter is preferred.

Once the preprocessing of the first sub-image has been performed, the sub-image is analyzed in order to extract the key features for comparing them against the key features extracted from the sub-image of the image 3 to be recognized. First the key features are extracted and from them descriptors can be later estimated. When the descriptors calculated from the sub-image from the image 2 captured by the camera 1 and the ones extracted from the image 3 to be recognized, a process for finding the matches between both arrays of images is applied. This process provides a set of good Correspondences C that are used in order to estimate whether the image 3 has been recognized in the original input image 2 or not.

To extract the key features from the image and the sub-images, several methods and approaches exist for this purpose. Included in those are such as scale and variant feature transform (SIFT), the fast-hessian detector used in SURF and center-surround extremas (CenSurE). Other methods could include patch information analysis.

If the image 3 to be recognized is not recognized in the first of the (1-n) sub-image, the current frame or current sub-image of the real world image 2 captured by the camera 1 is dropped and their variable is incremented one value. Thus, in the next input frame, the sub-image to be processed will be the one that was the next highest in likelihood to have the image 3 be recognized. The reason for working in this way is due to the assumption that an object will not move so fast for changing between one sub-area of the frame to another in the time the process analyzes the nine sub-images. As a result, if the recognition occurs in less than 9 sub-images, time will be saved.

Next the homography between the image 3 and the (1-n) sub-images for calculating the location of the image 3 to be recognized in the scene. If the image 3 has been recognized, a set of Correspondences between the points in the image 3 and the (1-n) sub-image will determine the Homography between them. For this estimation, the location of points in the image 3 to be recognized and their correspondence in the real scene of the image 2 are needed. An algorithm such as random sample consensus (RANSAC) can be applied for estimating the Homography. This method is an algorithm for robust fitting of models in the presence of a plurality of data outliners. Using this information, i.e., homography, the corners of the image 2 are recognized in the real scene as follows:

$$Z = 1/((H_{20})*x + (H_{21}) + (H_{22})*z))$$

$$X = 1/((H_{00})*x + (H_{01})*y + (H_{02})*z))$$

$$Y = 1/((H_{10})*x + (H_{11})*y + (H_{12})*z))$$

Where the image to be recognized=img1
Sub-image selected from the input frame=subfrm
H is the homography matrix of a size 3×3
$x = img1_x$ and $y = subfrm_y$ Let the corners of the image 3 to be recognized in the (1-n) sub-frame will be X and Y and this procedure can be repeated for the four image corners to provide the four X and four Y coordinates of the four image corners. Still further, as the input image for the feature extraction process has been selected from the input image, the area selected must be added to this new corners locations in order to calculate the exact location of the corners of the image 3 to be recognized in the original input image 2.

While the above system has been generally described in terms of a single server and associated memory and software, it is also possible to implement this invention utilizing a cloud environment. A cloud environment or system is a distributed system of multiple machines handling complex tasks concurrently. The cloud architecture of the present invention includes a dynamic number of machines created to present high performance in measure of speed and scalability. The machines are coordinated by one master machine that receives the load of tasks and splits it over the available machines and creates new ones as necessary. The other machines are called slave machines and handle specific tasks ordered by the master machine. All of the machines communicate together using a high speed network to send messages between all parts of the system. Each request to the cloud is handled by the master machine and it splits it to sub-tasks and puts it in an indexed queue. The tasks are sent to the rest of the slave machines and are removed from the queue only after they are done. Response is sent to the user once all subtasks are finished. Another part of the cloud is a database which is also distributed over several machines and has one machine to control the request for access. The access is synchronized in this multi-threaded environment. Also the system parts are backed up for recovery repeatedly so that if one or more shuts down, the performance of the system is not hampered or destroyed.

While the above embodiment has been described in terms of dividing the image 2 into (1-n) sub-images to be compared with the image 3, it should be apparent to one of ordinary skill that an image 3 selected from a plurality of images stored in the memory could be divided into a plurality of sub-images and matching performed to recognize where the image to is located. It is also possible to do the sub imaging division on the device and later send it to the system to make it faster in terms of response. Since our system does not rely on having the whole scene image, the user of the system can decide to send directly those 1-n sub images.

It should be apparent to one of ordinary skill in the art that the above described embodiments are but a few of the many possible specific embodiments which can be made embodying the principles and objects of the present invention.

The invention claimed is:

1. An image recognition method comprising:
   (a) connecting via a network to a processor associated with a memory;
   (b) uploading an image to the memory from a source of images via said network;
   (c) dividing said image into a plurality of (1-n) sub-images;
   (d) before performing any processing of the image to assess whether an image to be recognized is present, setting an order of selecting the (1-n) sub-images according to an estimated probability of where the image to be recognized will appear in the image;
   (e) uploading the image to be recognized from an image source to said processor and associated memory via said network;
   (f) pre-processing said image to be recognized;
   (g) extracting key features from said image to be recognized;
   (h) pre-processing a first of said (1-n) sub-images according to the order of step (d) utilizing said processor and associated memory;
   (i) extracting key features from said first of said plurality of (1-n) sub-images;
   (j) comparing key features of said image to be recognized with key features of said first of said plurality of (1-n) sub-images;
   (k) if there is a sufficient match of key features, determining there is a match, displaying the match on a display, and ending processing;
   (l) if there is not a sufficient match of key features, advancing to a next of said plurality of (1-n) sub-images and repeating the steps (h) to (k) until a match is determined,
   wherein the image is divided into a middle sub-image, edge sub-images, and corner sub-images, and the order of selecting the (1-n) sub-images is set as the middle sub-image first, the edge sub-images next, and the corner subimages last.

2. The image recognition method according to claim 1 wherein said preprocessing comprises blurring the image.

* * * * *